Figure 1:
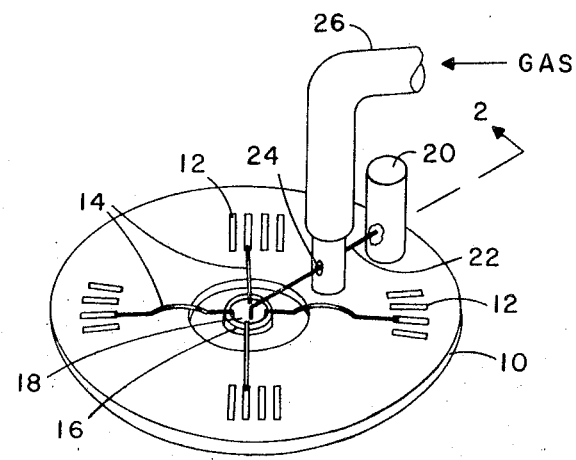

United States Patent

Hostetter

[15] 3,641,972
[45] Feb. 15, 1972

[54] PROBE ASSEMBLY

[72] Inventor: John L. Hostetter, Santa Ana, Calif.
[73] Assignee: Collins Radio Company, Dallas, Tex.
[22] Filed: Sept. 29, 1970
[21] Appl. No.: 76,356

[52] U.S. Cl. ..................................118/9, 118/401, 324/158 P
[51] Int. Cl. ..........................................................B05c 11/105
[58] Field of Search............118/8, 9, 401; 324/158 P, 158 D, 324/158 F; 101/35

[56] References Cited

UNITED STATES PATENTS

| | | | |
|---|---|---|---|
| 2,954,521 | 9/1960 | McKee | 324/158 P UX |
| 3,332,394 | 7/1967 | Cooke | 118/263 |
| 3,345,567 | 10/1967 | Turner et al. | 324/158 P |
| 3,437,929 | 4/1969 | Glenn | 324/158 P |
| 3,445,770 | 5/1969 | Harmon | 324/158 P |
| 3,405,361 | 10/1968 | Kattner et al. | 324/158 P |
| 3,493,858 | 2/1970 | Baron et al. | 324/158 P |

Primary Examiner—Morris Kaplan
Attorney—Henry K. Woodward and Robert J. Crawford

[57] ABSTRACT

A probe for electrically testing devices and including a marker means for marking defective devices. The marker includes a dye container, an open-ended capillary connected to the container, and actuation means in the form of a gas cylinder for actuating the marker.

2 Claims, 2 Drawing Figures

PATENTED FEB 15 1972 3,641,972

INVENTOR.
JOHN L. HOSTETTER

BY  *H. K. Woodward*

ATTORNEY

PROBE ASSEMBLY

This invention relates to test apparatus for small devices such as microminiature electronic circuits, and in particular to a test probe assembly including means for marking selected devices.

Integrated circuits are extremely small electronic devices which are useful in performing various digital and analog functions. Their small size permits very high-density packaging and allows their application in circuits with much higher speeds than those possible with larger, discrete components.

Briefly, integrated circuits are fabricated by photochemical techniques wherein active and passive circuit elements are formed in and on thin wafers of monocrystalline semiconductor material such as silicon. Each wafer may have hundreds or even thousands of identical circuits defined thereon, and after the photochemical fabrication is completed each wafer is scribed along the borders of the individual circuits to facilitate subsequent fracture of the wafer to obtain the plurality of individual integrated circuits.

The major cost in producing completed integrated circuits occurs after the photochemical processing when the various chips are mounted in packages and electrical connections are made between the chip and the package leads. Therefore, it is economically imperative to identify and discard defective integrated circuits prior to packaging. Because of the small size of the individual chips, the electrical testing of the integrated circuits is normally performed prior to the breaking of the semiconductor wafer, and the defective circuits are visibly marked so that they may be discarded after the wafer is broken.

Disclosed in copending application Ser. No. 882,580, filed Dec. 5, 1969, now U.S. Pat. No. 3,613,001, and assigned to the present assignee, is a probe assembly for testing integrated circuits and the like which includes a plurality of contacts arranged compatibly with the contacts of a circuit under test. Conventionally, a marker is combined with such a probe which comprises a dye container and capillary for applying the dye to a device.

Heretofore, to mark a reject, a droplet of dye has been applied to a device under test by striking the capillary with a hammer member thereby causing a droplet at the end of the capillary to make contact with the device. Such a marker has a number of disadvantages. A hammer blow is very difficult to control. Quantatively, the blow must be sufficient to cause the droplet to contact the device under test yet care must be taken not to drive the capillary into destructive contact with the device. Additionally, the hammer blow is basically a shock excitation, and this shock excitation may cause a ringing in the capillary. The consequent high acceleration of the capillary creates forces in the dye within the capillary which result in dispensing the dye in unwanted quantities and in undesired places. Also, such markers have been cumbersome to work with and obscure the visibility of an operator in positioning a device for probe testing. This is particularly important in test apparatus wherein the probe must be enclosed to facilitate temperature cycling of the device under test.

Accordingly, an object of the present invention is an improved multicontact probe and marker.

Another object of the invention is an improved marker which may be used with a microelectronic circuit probe in a small, enclosed space without obscuring the visibility of the probe contacts.

Still another object of the invention is a marker including a drive mechanism which provides deliberate and positive action.

Another object of the invention is a marker and actuator means which eliminates shock excitation and consequent ringing.

A feature of the invention is self-limiting means which precludes damage to a device under test.

Briefly, the invention includes, in combination, a multicontact probe and a marker including a liquid reservoir, a capillary extending from said reservoir, and a gas cylinder means for driving said capillary when marking a device under test. A hole extends through sidewalls of the cylinder portion through which the capillary is positioned, and a piston within said cylinder supportedly rests on said capillary. To actuate the marker, regulated gas pressure is supplied to said cylinder and piston thereby driving the capillary downwardly until marker fluid at the open end of the capillary contacts a device under test and is deposited thereon. While the regulated pressure may be closely correlated to capillary movement, the bottom of said hole in the sidewalls functions as a safety limit to the capillary movement thereby preventing damage to a device under test. Once the fluid is deposited, pressure is removed from said cylinder, and the capillary through spring action assumes its upper, static position.

Figure 2:
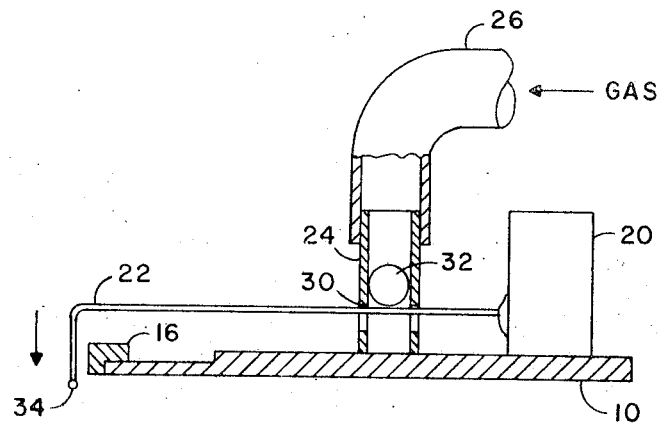

The invention and objects and features thereof will be more readily apparent from the following detailed description and appended claims when taken with the drawing, in which:

FIG. 1 is a perspective view of a probe assembly and marker in accordance with the present invention; and FIG. 2 is a side view partially in section of the marker illustrated in FIG. 1.

Referring now to the drawing, FIG. 1 is a perspective view of a probe assembly and marker in accordance with the present invention. As described in detail in copending application, Ser. No. 882,580, supra, the probe includes a support board 10 and a plurality of metallized bonding pads 12 which may advantageously comprise a printed circuit board. Attached to the metallized pads and supported by board 10 are a plurality of probe contacts 14. The contacts 14 rest in pressure engagement on an angular support 16 and extend through an opening 18 in board 10 and within angular ring 16. The points of contacts 14 are arranged to mate with the contact pads on a microelectronic circuit or like device which may be placed beneath the probe assembly for electrical test purposes.

As above described, conventional practice is to mark a device which proves defective during the electrical test. In accordance with this invention, provided with the probe assembly and mounted on support member 10 is a marker comprising a dye container 20 and a capillary 22 which leads from the container 20 through the opening 18 in the probe assembly. Driving the capillary 22 is a gas cylinder 24 containing a piston which is driven by an inert gas such as nitrogen from feedline 26.

The marker assembly is illustrated in more detail in FIG. 2 which is a side view of the marker assembly in FIG. 1 and includes the gas cylinder portion in section. Capillary 22 extends through a diametric hole 30 in the sidewalls of cylinder 24. The piston 32 within cylinder 24 is a sphere preferably having a diameter slightly less than the inside diameter of cylinder 24. Capillary 22 has sufficient rigidity to support piston 32 when gas pressure is relieved from line 26 and capillary 22 is allowed to assume a static position.

To mark a defective device, gas pressure is applied to cylinder 24 through line 26 driving piston 32 and capillary 22 downwardly until capillary 22 engages the bottom portion of hole 30. At this point an ink droplet 34 at the tip of capillary 22 engages the surface of the device under test and is deposited thereon. It is to be noted that hole 30 through cylinder 24 provides a self-limit to the drive of capillary 22 thereby preventing damaging contact of the capillary and the device under test.

Gas pressure is then relieved from line 26 and the gas within cylinder 24 is allowed to escape around the loose fitting piston 32. Spring action of capillary 22 moves the capillary and the piston 32 back to the static position and out of engagement with a device under test.

In one model which has been successfully tested the inside diameter of the cylinder is 0.050 inch, the sphere piston is three sixty-fourths inch in diameter, and the capillary has an OD of 0.010 inch, an ID of 0.005 inch, and a length of 0.9 inch. The clearance hole through the cylinder is 0.020 inch, thus the stroke of the piston is 0.010 inch. It will be noted that the open end of the capillary is below the reservoir level, but the dye does not drain because of surface tension of the droplet. Solderable material, such as brass, is preferably used in the construction.

The described marker occupies a small portion of the probe assembly and allows visibility of the probe contacts when aligning a device under test. The compact structure readily lends itself to applications within an enclosed test environment. Advantageously, the dye may be accurately placed without a ringing of the capillary, and the self-limiting feature eliminates the possibility of damaging contact between the capillary and the device under test.

While the invention has been described with reference to a specific embodiment, the description is illustrative and is not to be construed as limiting the invention. Various modifications and changes may occur to those skilled in the art without departing from the spirit and scope of the invention as defined by the appended claims.

What is claimed is:

1. A probe assembly for electrically testing very small devices and identifying defective devices comprising a support member, an opening extending through said support member, a plurality of contacts mounted on said support member and extending through said opening, marking means including dye container means mounted on said support member; an open-ended capillary extending from said container means through said opening; gas cylinder means for moving said open-ended portion of said capillary, a hole passing through the cylinder sidewall, said capillary extending through said hole, a piston comprising a sphere of lesser diameter than the inside diameter of said cylinder disposed within said cylinder and resting on said capillary, and means for providing gas pressure to said cylinder whereby to actuate said piston and to effect movement of the capillary.

2. In combination with a probe assembly, a marker comprising dye container means, an open-ended capillary extending from said container means whereby dye flows from said container means to said open end of said capillary, gas cylinder means for moving said open end in a vertical direction, a hole passing through the sidewall of said cylinder, said capillary extending through the hole, a piston comprising a sphere of lesser diameter than the inside diameter of said cylinder disposed within said cylinder and resting on said capillary, and means for providing gas pressure to said cylinder whereby to actuate said piston and to effect movement of the capillary.

* * * * *